2 Sheets—Sheet 1.

W. LOREY.
Lawn-Mower.

No. 214,411. Patented April 15, 1879.

Attest:
C. Clarence Poole
Lev. Seely

Inventor:
William Lorey
by Ellis Spear
Atty

W. LOREY.
Lawn-Mower.

No. 214,411. Patented April 15, 1879.

Attest:
C. Clarence Poole
Lw Suly

Inventor:
William Lorey
by Elris Spear
Atty.

UNITED STATES PATENT OFFICE.

WILLIAM LOREY, OF PHILADELPHIA, PENNSYLVANIA.

IMPROVEMENT IN LAWN-MOWERS.

Specification forming part of Letters Patent No. 214,411, dated April 15, 1879; application filed March 8, 1879.

*To all whom it may concern:*

Be it known that I, WILLIAM LOREY, of Philadelphia, Pennsylvania, have invented an Improvement in Lawn-Mowers, of which the following is a specification.

My invention relates to a lawn-mower of that class in which the grass is severed by a rotary cutter driven by gearing from the main wheels, and acting in connection with a fixed cutter attached to the frame of the machine.

The peculiarities of construction which constitute the essential features of the invention are hereinafter fully described, and specifically pointed out in the claims.

Figure 1:
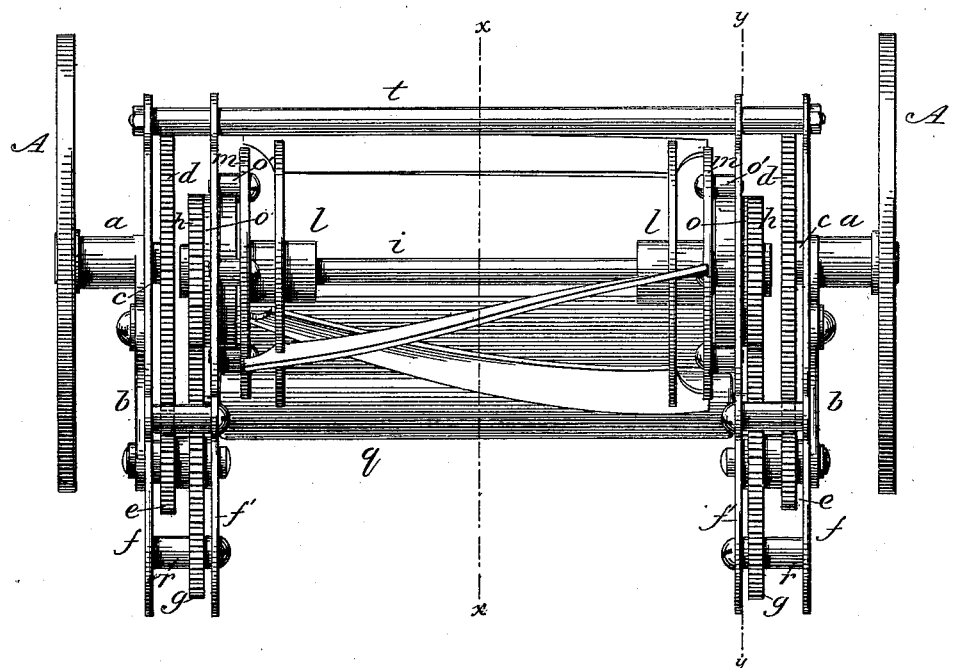
Figure 2:
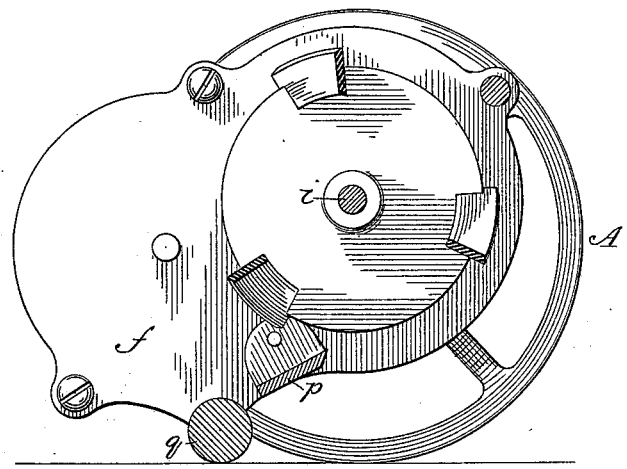
Figure 3:
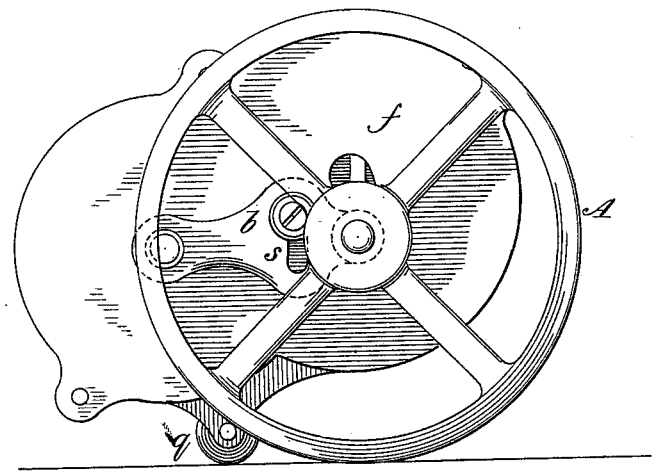
Figure 4:
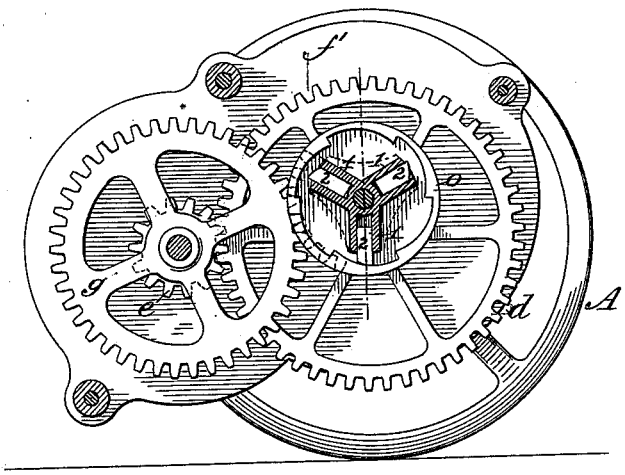
Figure 5:
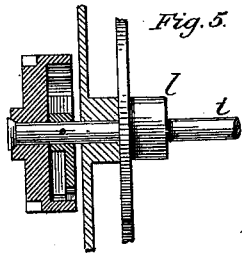

In the drawings accompanying this specification and forming a part thereof, Figure 1 is a plan view of the machine. Fig. 2 is a section on line $x\, x$ of Fig. 1. Fig. 3 is a side elevation; Fig. 4, a section on line $y\, y$ of Fig. 1; and Fig. 5, a detached view of the pawl-connection.

In the drawings, A A are the main driving and supporting wheels of the machine. These wheels may be made with the usual broad tread, which may extend inward toward the side of the frame, so as to come nearly in contact therewith. They are supported upon short axles journaled in boxes $a\, a$, which boxes are carried upon the ends of arms $b\, b$.

Upon the inner ends of the short axles $c\, c$ are fixed the main driving-gears $d\, d$, by which power is imparted to the train of gearing which drives the revolving cutter. These main gear-wheels mesh into small pinions $e\, e$, journaled in the two side plates $f\, f'$ of the gear-casing.

Upon the same axes of these small gears $e\, e$ are fixed larger gears, $g\, g$, which, in turn, mesh into pinions $h\, h$, revolving loosely upon the ends of the shaft $i$ of the revolving cutter. These pinions carry upon their inner faces rims $o\, o$, having internal ratchet-teeth. (Shown in Fig. 4.)

The pawls which connect with this ratchet are carried in three or more radially-arranged grooves, 1 1 1, in a wheel or disk fixed on the shaft of the rotary cutter and within the rims. The form and arrangement of these parts are clearly shown in Fig. 4.

Three radially-arranged grooves are shown, that being the least number which may be used consistently with the effectual operation of the device. They diverge from the center radially and open at the periphery at equal distances asunder.

The disk may be in the form of a solid wheel, or may consist of grooved arms on a hub. The grooved face of the disk is turned to the face of the pinion $h$ in order to retain the pawls in place.

The pawls (marked 2 2 2, Fig. 4,) slide freely in the grooves, and fall by gravity when their respective grooves turn downward; and in falling engage with the teeth of the ratchet. This construction requires no springs, the force of gravity being sufficient for the purpose.

The teeth of the ratchet and the guide of the pawls are formed, as shown, with faces arranged radially on one side and inclined on the other, so that the pawls engage in the forward motion of the wheel, but ride freely over the teeth when the machine is moved backward, causing the cutter to rotate only with the forward motion.

It will be observed that the gearing is inclosed between two side plates, $f\, f'$, which serve as a support and as a casing for the said gearing, and also as a part of the main frame of the machine. They are cut away, as shown in Fig. 4, to give space for the rims upon the pinions $h\, h$. The shaft of the rotary cutter is journaled in boxes $l\, l$, fixed in disks $m\, m$, which are connected by bolts passing through sleeves $o'\, o'$ into the inner sides, $f\, f'$, of the gear-casing. The rotary cutter is fixed upon the shaft, and is of the ordinary construction. It acts in connection with the ordinary fixed cutter $p$, connected to the main casing in the manner clearly shown in the drawings. The edge of this fixed cutter is vertically (or approximately so) beneath the axis of the rotary cutter, and in nearly the same line with the axes of the main driving-wheels.

A supporting-roller, $q$, is arranged in rear of the fixed cutter, and is of the ordinary construction, and serves the ordinary purpose. The side plates $f\, f'$ of the gear-casings are bolted to each other by bolts $r\, r$ passing through sleeves to hold the plates at a proper distance asunder. The edges of these casings are represented as open; but they may be conveniently closed, and, in practice, will be so closed by any suitable covering of sheet metal or other material.

The arms b b, which carry the boxes for the shafts of the main driving and supporting wheels, are pivoted upon the axles of the pinions e e, prolonged to pass outside of the case f for that purpose. The axles of the main drive-wheels pass through slots in the outer casings, f, formed upon the arc of a circle from the center of the journals of the pinions e e, so that the frame may be raised or lowered upon the drive-wheels without disturbing the connection of the main driving-gears with the small pinions e e.

The arms b b may be provided with a slot, s, and set-screw for holding the arms in any desired position, to give any proper elevation to the main frame and its cutting apparatus. These arms b b may be dispensed with, and other means for holding the boxes in place may be provided; but these boxes must always be adjusted in a curve formed upon the axes of the pinions e e as a center, in the manner above described.

I have shown the ratchet-connection by which the power from the drive-wheels is communicated to the shaft of the rotary cutter as attached to the last gear-wheels. They may, however, be placed at other points, and I may prefer to place this pawl-and-ratchet connection upon the journals of the small gears e.

Ordinary handles may be attached to any convenient point upon the frame, and may extend to the rear in position convenient for the operator.

The two pairs of plates which form the sides of the frame are held together by one or more transverse bars, t, as well as by the stationary cutter.

My improved lawn-mower has all the advantages of compactness and convenience of operation with simplicity in construction. The cutters being approximately in line with the axles of the wheels there is no lateral movement of these cutters when the machine is moving upon curved lines, and the action of the cutters is therefore not materially affected by deviation of the machine when in operation from a straight line.

It will be obvious that the closeness of the cut to the ground will depend upon the adjustment of the frame upon the main supporting-wheels, effected by means of the main axles moving in the curved slots.

I am aware that it is not new to arrange the cutting apparatus directly in line with the axles of the main supporting-wheels; and I am also aware that lawn-mowers having the driving-gear inclosed in a case have been heretofore shown.

What I claim as my invention, and desire to secure by Letters Patent, is—

1. In a lawn-mowing machine, a main frame adjustable vertically upon the axes of the supporting-wheels, said frame carrying fixed and rotary cutters approximately in line with the axles of the said wheels in fixed relation to each other, as set forth.

2. The main frame carrying the fixed and rotary cutters held in fixed relation to each other, and vertically adjustable with said frame upon the axles of the main wheels, in combination with a secondary supporting-roller, as set forth.

3. The main frame having curved slots to admit the axles of the supporting-wheels adjustable vertically thereon, in combination with the main driving-gears fixed upon the ends of the axles, and the secondary pinions for transmitting motion to the rotary cutter, as set forth.

4. The combination of the slotted plates of the main frames, the bars b b, pivoted as described, and carrying the boxes for the axles of the main supporting-wheels, and of the gearing by which the power is transmitted to the rotary cutter, as set forth.

In testimony whereof I have signed my name to this specification in the presence of two subscribing witnesses.

WILLIAM LOREY.

Witnesses:
L. W. SEELY,
NELSON LYON.